United States Patent [19]

Gorman

[11] 3,740,693

[45] June 19, 1973

[54] BUS BAR WITH INTEGRAL TERMINALS

[75] Inventor: John Thomas Gorman, Pennsauken, N.J.

[73] Assignee: RCA Corporation, New York, N.Y.

[22] Filed: May 24, 1971

[21] Appl. No.: 146,123

[52] U.S. Cl. .................................. 339/19, 339/242

[51] Int. Cl. .............................................. H01r 31/08

[58] Field of Search ...................... 339/19, 22, 242, 339/276; 113/119; 174/88 B, 99 B, 68 B

[56] References Cited

UNITED STATES PATENTS

| | | | |
|---|---|---|---|
| 3,157,454 | 11/1964 | Collins | 339/223 |
| 3,625,038 | 12/1971 | Swigert | 72/20 |
| 1,913,871 | 6/1933 | Connell et al. | 339/19 |

OTHER PUBLICATIONS

Malco Mfg. Co., Wrapost Bus Bars, 1964 339–276(A).

*Primary Examiner*—James A. Leppink
*Assistant Examiner*—Robert A. Hafer
*Attorney*—Edward J. Norton

[57] ABSTRACT

A bus bar is provided having terminals formed from and integral with the bus bar for interconnection to high density arrayed wire wrap terminals. The current carrying cross-sectional area of the bus bar is provided with any preselected width or thickness regardless of the terminal cross-sectional area, the dimensions defining the terminal cross-sectional area being less than either the width or thickness dimensions of the bus bar. Additionally, the width and thickness dimensions of the bus bar are preselected in accordance with the current carrying requirements of the bus bar independently of the terminal cross-section dimensions without affecting the integrity of the connection of the terminals to the bus bar.

2 Claims, 10 Drawing Figures

INVENTOR.
JOHN T. GORMAN
BY
William S. Gill[?]
ATTORNEY

INVENTOR.
JOHN T. GORMAN
BY
ATTORNEY

BUS BAR WITH INTEGRAL TERMINALS

The invention herein described was made in the course of or under a contract or subcontract thereunder with the Department of the Navy.

BACKGROUND OF THE INVENTION

The present invention relates to bus bars and, in particular, to bus bars for use with wire wrap terminals.

In the electronics art, especially in communications, data processing, and radar systems, the packaging of these systems has been directed to effecting size reduction through the use of miniaturization techniques. One such technique that has found wide-spread use is the utilization of wire wrap terminals. These terminals have been employed with printed circuit board connectors. To further effect miniaturization the individual connectors have been eliminated, and the wire wrap terminals are inserted in high packing densities on panels or so called back-plane assemblies. For example, these terminals may be assembled in arrays of pins or terminals on 0.08 to 0.100 inch centers, the terminals being generally square in cross-section of about 0.025 to 0.030 inches on a side.

To effect interconnection of these terminals, wire wrap techniques have been developed which interconnect various selected terminals with separate interconnecting wires. These wire wrap terminals are readily adaptable for efficient automatic or hand held tool wire wrapping methods. To further miniaturize the assembly, bus bars are commonly used to interconnect certain of the terminals which have common electrical functions, the bus bar carrying relatively large currents for the distribution of power and DC to high frequency signals with a minimum number of interconnections among the various terminals. To provide the desired miniaturization, these bus bars are located adjacent to or assembled on the backplanes to minimize the amount of interconnecting wiring. Further, terminals are generally provided on the bus bar on a one-for-one basis with terminals on the backplane to which the bus bar is to be connected. A wire conductor is then assembled to each terminal to interconnect the various terminals.

In the prior art to provide bus bars capable of handling relatively large currents, i.e. one which presents a minimum resistance for a given current, the bus bar is provided with a relatively large cross sectional area in a solid block of material. The terminals are then assembled separately to the bus bar by insertion in mating receptacles in the bus bar. However, this structure requires an interconnecting joint between each of the bus bar terminals and the bus bar, which joint interferes with high frequency signals to be distributed by the bus bar and, therefore, introduces losses in the interconnecting system.

SUMMARY OF THE INVENTION

According to the present invention a bus bar for the distribution of power and DC to high frequency signals comprises a sheet of conductive material of a given thickness folded upon itself to form at least two layers. This fold permits the bus bar to carry relatively high currents in a comparitively restricted envelope of a given width and height conforming to the width and thickness of the bus bar. At least one electrical terminal extends from the bus bar, the terminal being formed from and integral with the sheet eliminating an additional resistive coupling between the terminal and bus bar. The terminal has a rectangular cross-section, one dimension of the cross-section being coplanar with the sheet from which the terminal is formed. The one dimension is no greater than the other dimension of the cross-section of the terminal. Therefore, a relatively small cross-sectional area terminal is provided integral with a substantially larger mass bus bar.

DESCRIPTION OF THE PREFERRED EMBODIMENTS

Figure 1:
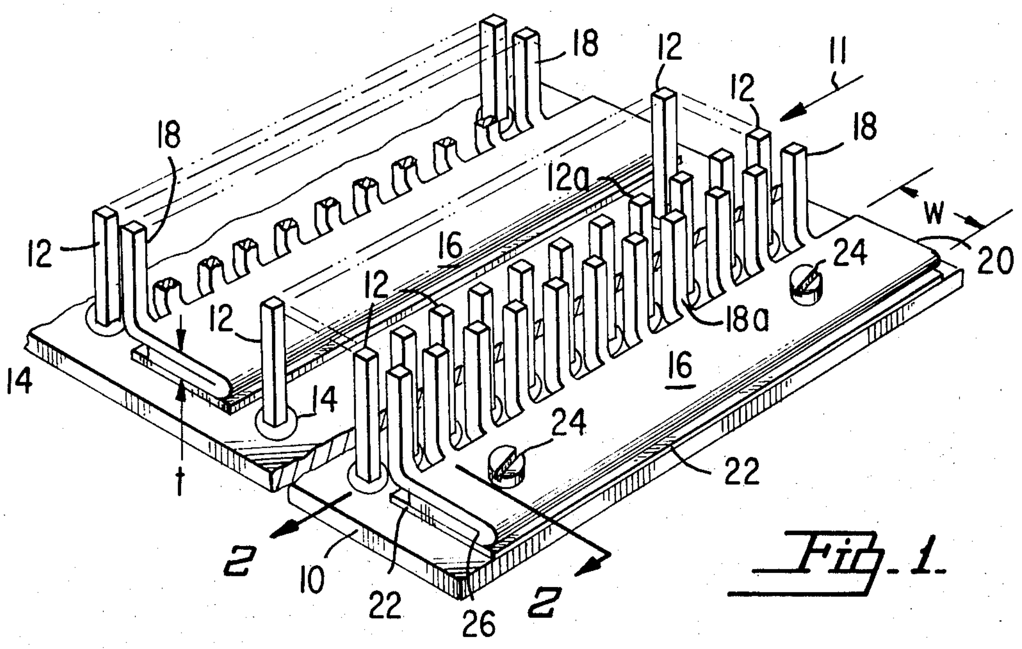
FIG. 1 is a fragmented perspective view of a connector panel assembly employing a plurality of wire wrapped terminals and a bus bar in accordance with the present invention for interconnecting the bus bar to selected ones of the panel wire wrap terminals.

In FIG. 1 there is illustrated a connector panel 10 in which are inserted a plurality of wire wrap terminals 12. Panel 10 is a planar sheet of metal or the like having a hole therein for each wire wrap terminal in which hole is inserted an insulating terminal retaining insert 14 through which the terminals 12 are each inserted. Each insert 14 respectively gripes and secures a terminal 12 to the panel 10 as known in the art. To provide high packing density, terminals 12 are disposed in a compact array on either one thousandths of an inch centers on panel 10 for interconnecting various printed circuitries (not shown). Various selected ones of the terminals 12 are used to carry load, power, and DC to high frequency signals employed in the particular system of which the panel 10 is part. Panel 10 and its related wire wrap terminals are not part of the present invention.

In FIG. 1, two bus bars 16 in accordance with the present invention are illustrated, the bus bars being disposed alternately with a plurality of densely packed terminals 12 on panel 10. This alternate arrangement may be repeated several times (not shown) to effect the desired miniaturization of the assembly. The separate bus bars may each have the same or different configuration as will be described in conjunction with FIGS. 3 and 4. For purposes of illustration only one bus bar configuration is shown in detail in FIG. 1.

In FIG. 1, bus bar 16 in accordance with the present invention is provided an overall thickness *t* and a width *w*. Wire wrap type terminals 18 are formed from the integral with bus bar 16 in a manner to be described.

By the term wire wrap type is meant a terminal having substantially the same cross-sectional area and shape as a wire wrap terminal but made of material which is softer than that required to obtain an acceptable solderless wire wrap connection as known in the art. For example, where a typical minimum terminal strength for an acceptable wire wrap connection is approximately 50,000 psi, the minimum terminal strength of a terminal on a bus bar of the present invention may be less than 50,000 psi.

Terminals 18 are approximately the same size in cross-section as terminals 12, the cross section being defined below, and are spaced from each other in alignment with terminals 12 on panel 10 preferably on a one for one interconnecting basis as will be described. Certain ones of terminals 12 and 18, are interconnected, but as shown in FIG. 1, the interconnection is omitted for purposes of clarity. The manner of interconnecting these terminals is illustrated and explained in conjunction with FIG. 5. Bus bar 16 is electrically isolated from panel 10 by dielectric layer 22. Dielectric layer 22 is any insulating material as known in the art. Bus bar 16 is secured to panel 10 by nylon screws 24 or other conventional insulating fastening means.

In accordance with he present invention, a bus bar is provided which has a wide range of cross-sectional dimensions *t* and *w*. These dimensions meet both the space requirement dictated by the associated packaging structure such as panel 10 in the direction of the dimension *w* and the minimum resistive requirement for the current to be carried by the bus bar along its length. At the same time, high packing density of terminals 18 is provided bus bar 16 to meet the miniaturization requirement of the package while simultaneously providing terminals 18 integral with bus bar body 20 of bus bar 16 to eliminate resistive connections which would otherwise be present between separate terminals and the bus bar body as known in the prior art. Thus, the bus bar of the present invention provides improved signal handling capabilities for high frequency signals without a corresponding signal handling loss in effecting miniaturization.

Figures 2, 3A:
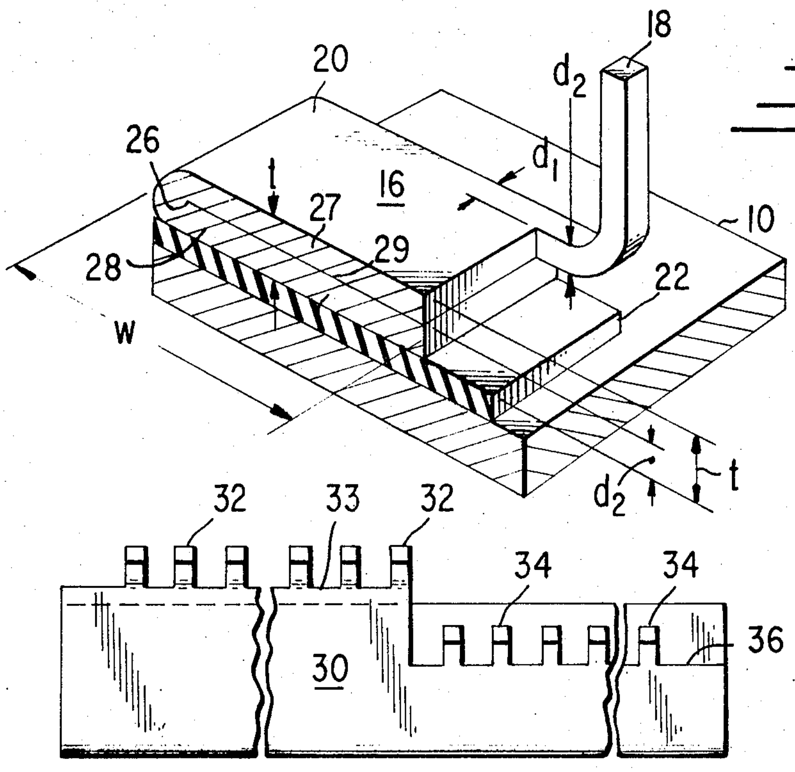
FIG. 2 is an enlarged fragmented perspective view along the lines 2—2 of FIG. 1.
FIGS. 3*a* and 3*b* show plan and side elevation views respectively of another embodiment of a bus bar in accordance with the present invention.

To provide the flexibility of thickness *t* for a given width *w* for bus bar body 20 while providing wire wrap type terminals integral with body 20, a sheet of copper is folded over upon itself at location 26 as illustrated in FIGS. 1 and 2.

FIG. 2 shows in greater detail an enlarged cross-section of the bus bar and the particular features of the bus bar in accordance with the present invention. As shown in FIG. 2, bus bar 16 is formed of a sheet of conductive metal, preferably soft copper and preferably 0.030 inches thick. This sheet is folded upon itself at location 26 to provide a 180° bend such that there are two layers 27, 28 which are contiguous with each other at location 29 and which are substantially parallel with each other. The contiguous relationship between layers 28 and 27 provides a compact bus bar utilizing a minimum of space when deployed. It is apparent that these layers do not need to be contiguous to provide the current carrying capability of the body 20 along its length. Terminals 18 are preferably stamped from the sheet of copper which form the body 20.

Each of the terminals 18 is provided with a substantially rectangular cross-section as shown in FIG. 2. This rectangular cross-section of terminal 18 which is typical of all the terminals illustrated in bus bar 16 of FIG. 1 has one dimension $d_1$ and a second dimension $d_2$, dimension $d_2$ being the same dimension as the thickness of the sheet of copper which forms the body 20 of bus bar 16. The other dimension $d_1$ is parallel to the plane of the sheet and is preferably formed by conventional stamping means as known in the art. Dimension $d_1$ is the same as or less than dimension $d_2$. This provides for either a square cross-sectional area for terminal 18 or a rectangular cross-section whose smaller dimension is parallel to the plane of the bus bar as shown by dimension $d_1$. Terminal 18 is preferably bent as shown for coupling with selected ones of terminals 12 on panel 10 of FIG. 1. By using a relatively thin layer of copper as the material for forming bus bar 16, relatively small cross-sectional areas ($d_1 \times d_2$) can be provided terminals 18, and, thus a larger plurality of terminals can be provided on a one for one basis with a like plurality of terminals on panel 10 to which terminals 18 are each to be respectively aligned and interconnected. That is, one terminal 18 may be connected with one terminal 12 such as terminals 18*a* and 12*a* of FIG. 1 which are aligned adjacent each other as shown.

Figure 5A:
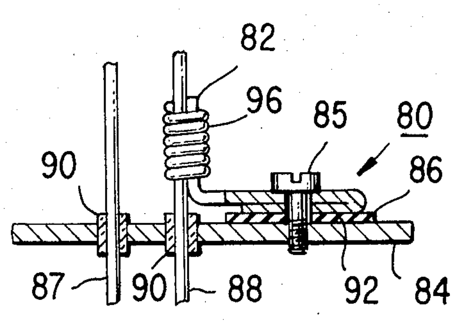
FIGS. 5*a*, 5*b* and 5*c* illustrates various methods of connecting different embodiments of a bus bar in accordance with the present invention to wire wrap terminals on a connector panel.
Figure 5B:
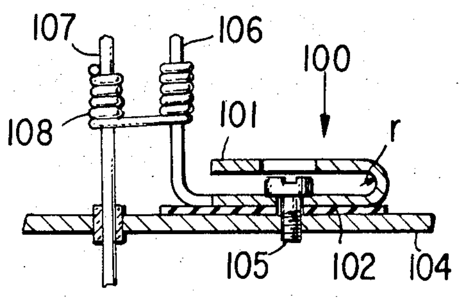

As indicated above, the copper sheet that forms the bus bar 16 is preferably soft copper to permit each of layers 27 and 28 to be folded 180° upon themselves in contiguous relationship and having a sharp bend radius r (see FIG. 5*b*). As known in the metal forming art, to provide a sheet of material harder than soft copper such as half hard or hard copper, or, for example beryllium copper, the bend radius at location 26 should be a preselected minimum dimension to prevent failure of a sheet at the bend when the material is bent, a general rule of thumb in the metal forming art is that the minimum bend radius r is equal to or greater than the thickness of the material. Bus bars fabricated of various hardness or materials will be described in conjunction with FIG. 5 with respect to describing the interconnection of the bus bar terminals with the adjacent panel terminals such as terminals 18*a* and wire wrap terminals 12*a* of panel 10.

In FIGS. 1 and 2, the copper sheet forming the bus bar body 20 is shown folded upon itself once to form two layers. It will be appreciated that the number of layers formed by the sheet is provided in accordance with the present invention by providing a bus bar width *w* and thickness *t* (FIG. 1) as determined by the current carrying requirements of the bus bar. Additionally, terminals 18, and terminals 12 to which terminals 18 are to be connected may be parallel and in line with respect to each other such as terminals 12 in row 11 of FIG. 1. As will be described, the terminals and layers which form the bus bar body may be provided in other configurations in accordance with the present invention. In these other configurations, the terminal dimensions $d_1$ and $d_2$ and terminal array are provided independently of the preselected dimensions t and w of the bus bar body 20. Thus, there may be advantageously provided a large degree of flexibility between the terminal 18 configuration and array and in the width and thickness dimensions of bus bar 16.

Figure 3B:
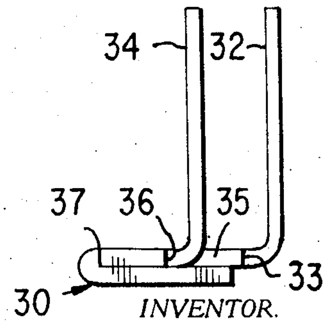

Another embodiment of the bus bar in accordance with the present invention is illustrated in FIG. 3. FIG. 3a shows a plan view of a bus bar 30 having a plurality of terminals 32 and 34, terminals 32 extending from and formed from an edge 33 of the sheet which forms the bus bar body 35 of bus bar 30. Terminals 32 are bent in the same direction parallel with each other as shown. Bus bar 30 has a second edge 36 set back from and parallel to edge 33. Terminals 34 are formed from and extend from edge 36 of the sheet of copper which forms the body 35. Terminals 32 and 34 form two parallel rows. This arrangement permits interconnection with terminals in a corresponding panel to which the terminal 32 and 34 are to be interconnected. As shown in FIG. 3*b*, an end view of the bus bar of FIG. 3*a*, the sheet forming the bus bar body is folded upon itself 180° at location 37 to form two contiguous layers having a sharp bend at location 37. Bus bar 30 is formed of soft copper permitting this 180° fold of the sheet upon itself with the sharp bend radius. Cross-sectional dimensions ($d_1 \times d_2$ FIG. 2) of terminal 32 and 34 are provided in a manner similar to that described above with respect to terminals 18 on bus bar 16 of FIGS. 1 and 2.

Figure 4A:
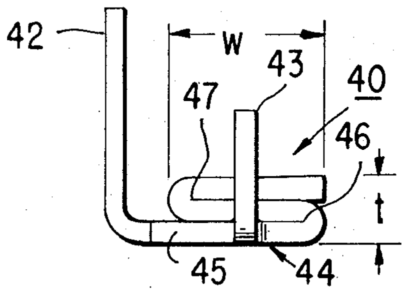
FIGS. 4*a*, 4*b* and 4*c* illustrate end and cross-sectional views of various different embodiments of bus bars in accordance with the present invention similar to the view of FIGS. 2 and 3*b;*

In FIG. 4*a* there is shown a bus bar 40 having a plurality of terminals 42, 43 formed from and integral with bus bar body 44. Terminals 42 and 43 are each formed from a sheet of conductive material from which the bus bar is fabricated in a manner similar to that described above with respect to the bus bar of FIGS. 1 and 2. In this instance, terminals 42 (other terminals 42 being aligned into the drawing behind the terminal 42 shown) extend from the bottom of layer 45 of the bus bar as does terminal 43. Terminal 43 extends from an edge of layer 45 at an end of the bus bar while terminals 42 extend from a longitudinal edge of layer 45. Additionally, bus bar 40 is provided with a plurality of folds of the sheet of material upon itself. Thus there are two bends, one at each of locations 46 and 47. The cross-sectional areas of terminals 42 and 43 ($d_1 \times d_2$ FIG. 2) are similarly related to the material from which bus bar 40 is fabricated in the manner explained above with respect to the bus bar 16 of FIGS. 1 and 2. The thickness $t$ of bus bar 40 is selected in accordance with the number of layers provided, in this instance, there are three layers of material. The cross-section dimensions ($d_1 \times d_2$ FIG. 2) of terminals 42 and 43 is made the same as that of terminals 18 of FIGS. 1 and 2 while the approximate cross-sectional area ($w \times t$) of bus bar body 44 is substantially increased by providing three layers to meet the current carrying requirements of bus bar 44 for a given width $w$.

Figure 4B:
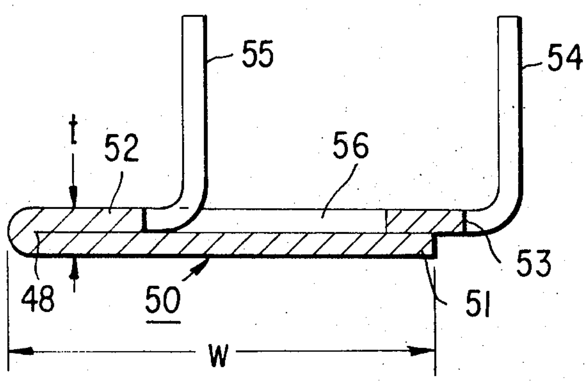

FIG. 4*b* is another embodiment of the bus bar in accordance with the present invention illustrating terminals extending from the bus bar at locations other than the sheet edges. Bus bar 50 comprises two layers 51 and 52 in which the material of the us bar is folded upon itself 180° in a sharp bend at location 48. As shown there are two sets of terminals 54 and 55 (each set being arrayed into the drawing). The cross-sectional area ($d_1 \times d_2$ FIG. 2) of terminals 54 and 55 are each provided similarly as illustrated in connection with FIG. 2. Terminals 54 and 55 are formed from the bus bar sheet and, therefore, are integral with the bus bar body formed by layers 51 and 52.

The first set of terminals 54 extend from edge 53 of bus bar 50 and the second set of terminals 55 extend from the bus bar body interior at location 56, the terminals 55 being lanced from layer 52. As seen in FIGS. 3, 4*a*, and 4*b*, terminals having substantially the same cross-sectional areas are provided in a wide variety of relative positions along the bus bar length and width while at the same time the terminals are integral with the body of the bus bar.

Figure 4C:
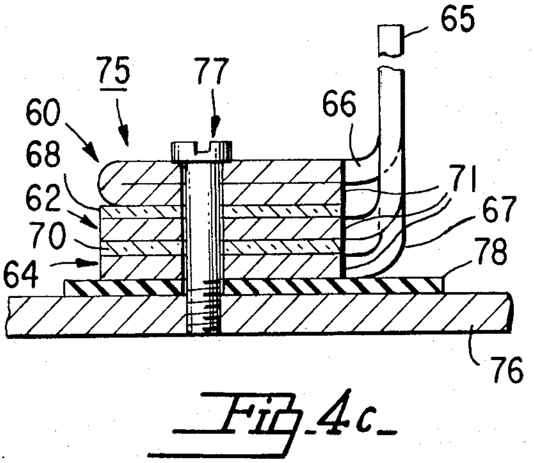

Another embodiment of the bus bar in accordance with the present invention is illustrated in FIG. 4*c* where a laminated bus bar is shown. In FIG. 4*c* bus bar 75 is provided a first bus bar layer 60 which is identical to the bus bar 16 of FIGS. 1 and 2. Second and third bus bar layers 62 and 64 are constructed of a sheet of conductive material from which terminals 65 and 67, respectively are formed. The terminals are than bent as shown. Each of layers 60, 62, and 64 are arranged in sandwiched relationship to form bus bar 75 and have respective terminals 65, 66 and 67 extending from the respective layers at one edge 71 of each of the sheets of material forming bus bar 75. Each of these terminals is formed from and integral with the bus bar layer from which that terminal extends. Each of the terminals 65, 66 and 67 may be extended in interdigitized relationship (not shown) with respect to each other into the drawing or may be formed in discrete sets (not shown) along the length of the bus bar into the drawing. The cross-sectional area ($d_1 \times d_2$ FIG. 2) of each of the terminals 65, 66 and 67 is provided in a manner described above with respect to FIGS. 1 and 2. Sandwiched between layers 60 and 62 is an insulating layer 68 as known in the art. Sandwiched between layers 62 and 64 is a second insulating layer 70 of similar material as layer 68. Insulating layers 68 and 70 and bus bar layers 60, 62 and 64 form the laminated structure of bus bar 75. The various layers of bus bar 75 are secured together to panel 76 by nylon screw 70 or other fastening means. Disposed between the bus bar 75 and panel 76 is insulating layer 78 to insulate bus bar 75 from panel 76.

Figure 5C:
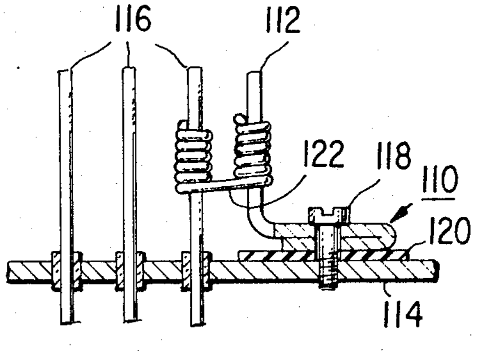

In FIGS. 5*a*, 5*b* and 5*c*, the several illustrations show various assembly techniques for coupling the terminals of a bus bar in accordance with the present invention to wire wrap terminals. In FIG. 5*a*, bus bar 80 is identical to bus bar 16 of FIGS. 1 and 2. Bus bar 80 has a plurality of terminals 82 arrayed in the longitudinal direction into the paper and is secured to panel 84 by nylon screw 85. Insulating layer 86 is disposed between bus bar 80 and panel 84 as known in the art. A plurality of wire wrap terminals 87, 88 are secured to the panel 84 by nylon inserts 90. Bus bar 80 is made of soft copper with layers 91 and 92 of the bus bar folded upon themselves 180° having a sharp bend at location 94. Each of terminals 82 of bus bar 80 is secured to a separate different wire wrap terminal on panel 84. Since, bus bar 80 is made of soft copper, a conventional gas tight wire wrap as known in the art is not used in this instance. Therefore a strand of wire 96 is wrapped around both of terminals 82 and 88, which terminals are placed in contiguous parallel relationship with respect to each other. The strand of wire 96 once wrapped as shown is then secured by conventional soldering techniques (not shown). Thus a miniaturized connection having high packing density is provided with a bus bar having a thickness t and width w preselected independently of the desired terminal cross-section.

In FIG. 5b bus bar 100 is made of hard copper or beryllium having a minimum tensile strength of about 50,000 psi. As noted previously, wire wrap terminals as known in the art may be fabricated from this material and, therefore, terminal 106 is capable of being connected by conventional wire wrap techniques. However, as to the bus bar body, the minimum bend radius $r$ at location 103 is governed by standard metal forming rules as indicated above. Thus, using 0.030 inch thick material the bend radius $r$ is approximately 0.030 inches. Bus bar 100 comprises layers 101 and 102 which are substantially parallel to each other and folded upon themselves as illustrated, the layers being spaced from each other a minimum distance that is substantially twice the sheet thickness. Bus bar 100 is secured to panel 104 by nylon screw 105. By making bus bar 100 of 0.030 inch thick sheet material, terminals 106 are provided with rectangular cross-sections that are substantially square and are 0.030 inches on a side. This terminal cross-section area is approximately the same for wire wrap terminals 107 which are secured to panel 104 in the manner described above with respect to FIG. 5*a*. The strand of wire 108 is wire wrapped to terminals 106 and 107 by conventional wire wrap techniques and the need for a solder joint is thereby precluded.

Terminal 106 is merely one of a plurality of terminals which are aligned behind terminal 106 into the drawing. Since the cross-sectional area of terminal 107 is preselected ($d_1 \times d_2$ of FIG. 2), the size of the cross-sectional area ($d_1 \times d_2$ - FIG. 2), of terminal 106 may be selected to be the same as that of terminal 107 by selecting the thickness of the bus bar sheet accordingly. Thus, there is effected a wire wrap terminal capable of having a gas tight joint as known in the wire wrap art. This terminal is integral with the bus bar whose cross-sectional area ($w \times t$ - FIG. 1) may be selected to any dimensional requirement permitting independent control of the dimensions of the bus bar in either the width $w$ or thickness $t$ direction of that bus bar.

Another method of coupling a bus bar in accordance with the present invention to wire wrap terminals is illustrated in FIG. 5*c*. In FIG. 5*c* bus bar 110 is identical to bus bar 16 of FIGS. 1 and 2. Bus bar 110 is provided a plurality of terminals 112 and is secured to panel 114 on which are secured a plurality of wire wrap terminals 116. Bus bar 110 is made of soft copper, is folded over itself 180°, and is secured to panel 114 by nylon screw 118, the bus bar being insulated from the panel 114 by insulating layer 120. Bus bar 110 is constructed preferably of 0.030 inch thick sheet copper such that the terminals 112 have an approximate cross-section of 0.030 on a side ($d_1 \times d_2$). Wire wrap terminals 116 also have a cross-sectional area in which each of the sides of the cross-section are preferably 0.030 inches on a side. Thus a strand of wire 122 may be wire wrapped to any of terminals 116 in the conventional manner by standard wire wrap tools. Wire 12 is then wrapped on terminal 112 whereupon the connection is soldered to terminal 112.

Thus, in accordance with the present invention, a bus bar is provided having a cross-sectional area of any given width and thickness and which has integrally secured thereto a large plurality of terminals having cross-section dimensions substantially smaller than either the width or thickness dimensions of the bus bar. The integral connection between the bus bar terminals and the bus bar body substantially eliminates the presence of discontinuities and distortions in high frequency signals introduced by an ohmic connection which otherwise would be present between separately assembled terminals and bus bar. Additionally, by increasing the bus bar thickness and reducing the width, skin effect is reduced. That is, for a given cross-sectional area the total surface area of the bus bar is reduced thus further effecting a reduction in resistance to the distribution of high frequency signals along the bus bar.

What is claimed is:

1. A bus bar, comprising:

a sheet of soft copper of a given thickness folded upon itself to form at least two elongated, parallel contiguous layers, one of said layers having a plurality of parallel edges, and a plurality of terminals extending from each of said parallel edges, said terminals being formed from and integral with said sheet, said terminals each having a given cross-section, one dimension of said cross-section being coplanar with the layer from which that terminal extends, said one dimension being no Greater than the other dimension of said cross-section.

2. A bus bar for the distribution of power or DC to high frequency signals comprising:

a sheet of conductive material of a given thickness folded upon itself to form at least two elongated layers each having a transverse edge and a longitudinal edge, and a plurality of electrical terminals extending from said bar at a plurality of said edges, at least two of which are parallel, said terminals each being formed from and integral with said sheet, said terminals each having a given cross section, one dimension of said cross section being coplanar with said sheet, said one dimension being no greater than the other dimension of said cross section, said elongated layers distribution sad power or DC to high frequency signals between said terminals.

* * * * *